United States Patent [19]

Ruggles

[11] Patent Number: 4,487,429

[45] Date of Patent: Dec. 11, 1984

[54] TILTING WHEEL VEHICLE SUSPENSION SYSTEM

[76] Inventor: Thomas P. Ruggles, 1417 Country Club Dr., Escondido, Calif. 92025

[21] Appl. No.: 428,548

[22] Filed: Sep. 30, 1982

[51] Int. Cl.³ .................................................. B62D 9/02
[52] U.S. Cl. .................................... 280/772; 280/691
[58] Field of Search .................... 280/112 A, 670, 675, 280/691, 772; 180/71, 73.1, 73.3

[56] References Cited

U.S. PATENT DOCUMENTS

| | | | |
|---|---|---|---|
| 2,299,926 | 10/1942 | Phelps | 280/670 |
| 2,310,821 | 2/1943 | Wimbish | 280/670 |
| 2,998,263 | 8/1961 | Muller et al. | 280/112 A |
| 3,092,397 | 6/1963 | Dullabaun et al. | 280/718 |
| 3,278,197 | 10/1966 | Gerin | 280/696 |
| 3,679,017 | 7/1972 | Roe | 280/112 A |
| 3,741,581 | 6/1973 | Patrin | 280/670 |
| 4,191,274 | 3/1980 | Goldberg et al. | 180/282 |
| 4,236,728 | 12/1980 | Policy et al. | 280/661 |
| 4,274,338 | 6/1981 | Uozumi | 105/144 |

FOREIGN PATENT DOCUMENTS

| | | | |
|---|---|---|---|
| 912534 | 5/1954 | Fed. Rep. of Germany | 180/73.3 |
| 1158383 | 11/1963 | Fed. Rep. of Germany | 180/73.3 |
| 967710 | 11/1950 | France | 280/772 |
| 302832 | 11/1932 | Italy | 280/772 |
| 368063 | 4/1963 | Switzerland | 280/772 |
| 872782 | 7/1961 | United Kingdom | 280/670 |

*Primary Examiner*—David M. Mitchell
*Assistant Examiner*—Ross Weaver
*Attorney, Agent, or Firm*—Brown, Martin & Haller

[57] ABSTRACT

A vehicle suspension system includes an independent suspension unit for each wheel pivotally secured to the chassis and interconnected with control linkage to simultaneously tilt the wheels into a turn when the vehicle is negotiating a turn. Each of the suspension units includes a generally cylindrical pod having a vertically oriented shaft mounted therein on which is mounted an axle support arm that is adapted to slidably move vertically with respect to the vehicle on the splined shaft and includes a spring of the coil-type disposed within the pod maintaining the axle support arm to the lower position within the pod. The front wheels are adapted to steer on the splined shaft with the spline shaft rotatably mounted within the pod. The rear wheels are adapted to slide only vertically with respect to the splined shaft and the wheel support arms are secured nonrotatably to the nonrotatable shaft. The tilting of the wheels is accomplished by direct gearing and pivotally interconnected linkage with the upper portion of the suspension pods and power assisted by means of hydraulic linear motors that are actuated in response to a tilt control lever on which is mounted the steering wheel of the vehicle. The steering of the front wheels is accomplished by direct gearing and rotatable shafts connected to the splined shaft rotatably mounted in the front suspension units and power assisted by means of a hydraulic linear motor that is activated in response to the rotation of the steering wheel of the vehicle. A support means of antifriction roller bearings fixed to the chassis and rotationally bearing against the forward and rear faces of the front and rear tie links near the suspension units, upper pivotal mounting means stabilizing the suspension units, through the complete tilt travel.

20 Claims, 9 Drawing Figures

TILTING WHEEL VEHICLE SUSPENSION SYSTEM

BACKGROUND OF THE INVENTION

The present invention relates to vehicle suspension systems and pertains particularly to a tilting wheel suspension system.

Vehicle suspension systems particularly for automobiles and the like are typically designed as a compromise between stability of the vehicle and comfort of the passengers. The stability of a vehicle when negotiating turns depend on quite a number of factors, including the balance of the vehicle, the weight distribution, the stiffness of the suspension and other factors. The traction of the tires with the road surface, on a vehicle is also a major factor in the stability of the vehicle when negotiating turns. With the conventional suspension system, when a vehicle negotiates a turn, the wheels remain in a generally vertical position and also lean toward the outside of the turn, with the result that the tires tend to try to roll off the wheels. This act of rolling off the wheels tends to lift the tread of the tire on the inside of the turn from the road surface. This considerably reduces the traction and, therefore, the stability of the vehicle.

The vehicle itself also tends to roll about its longitudinal axis while in a turn. Various suspension systems have been devised in an attempt to overcome these problems of the prior art. One approach to improving the traction and stability of a vehicle is that of tilting the vehicle wheels into the turn. The tilting of the vehicle wheels into a turn results in the weight and force acting on the wheels tending to act on the load bearing or in the load bearing direction on the tires. This results in improved traction and support by the tires of the vehicle.

Various approaches to tilting the wheel or the vehicle have been proposed in the past. One of these approaches is as disclosed in U.S. Pat. No. 3,278,197 issued Oct. 11, 1966 to Jacques Jean-Marie Jules Gerin. This patent discloses a system to vary the relative position of the wheel with respect to the suspended system thus, tilting the entire vehicle body or chassis into the turn. Another approach to such system is that disclosed in U.S. Pat. No. 4,191,274 issued Mar. 4, 1980 to Jerome Goldberg et al and entitled "Adjusting Automobile Suspension System". In this system, a complicated control system is disclosed which utilizes sophisticated controls for varying the tilt and camber of the respective wheels of the vehicle to some minor degree when in a turn.

It is desirable that a simple and inexpensive system for leaning the wheels of a vehicle into a turn for improved stability when negotiating turns be available.

SUMMARY AND OBJECTS OF THE INVENTION

It is the primary object of the present invention to provide an improved suspension system for automotive vehicles.

In accordance with the primary aspect of the present invention, an automotive vehicle suspension system includes an independent suspension unit for each wheel with a mounting pod for mounting the respective wheel for vertical movement of the wheel for accommodating road irregularities, for tilting the wheel into the turn when the vehicle enters and negotiates a turn, for turning the front wheels and driving the rear wheels independent of the other suspension functions.

BRIEF DESCRIPTION OF THE DRAWINGS

The above and other objects and advantages of the present invention will become apparent from the following wherein.

DETAILED DESCRIPTION OF A PREFERRED EMBODIMENT

Figure 1:
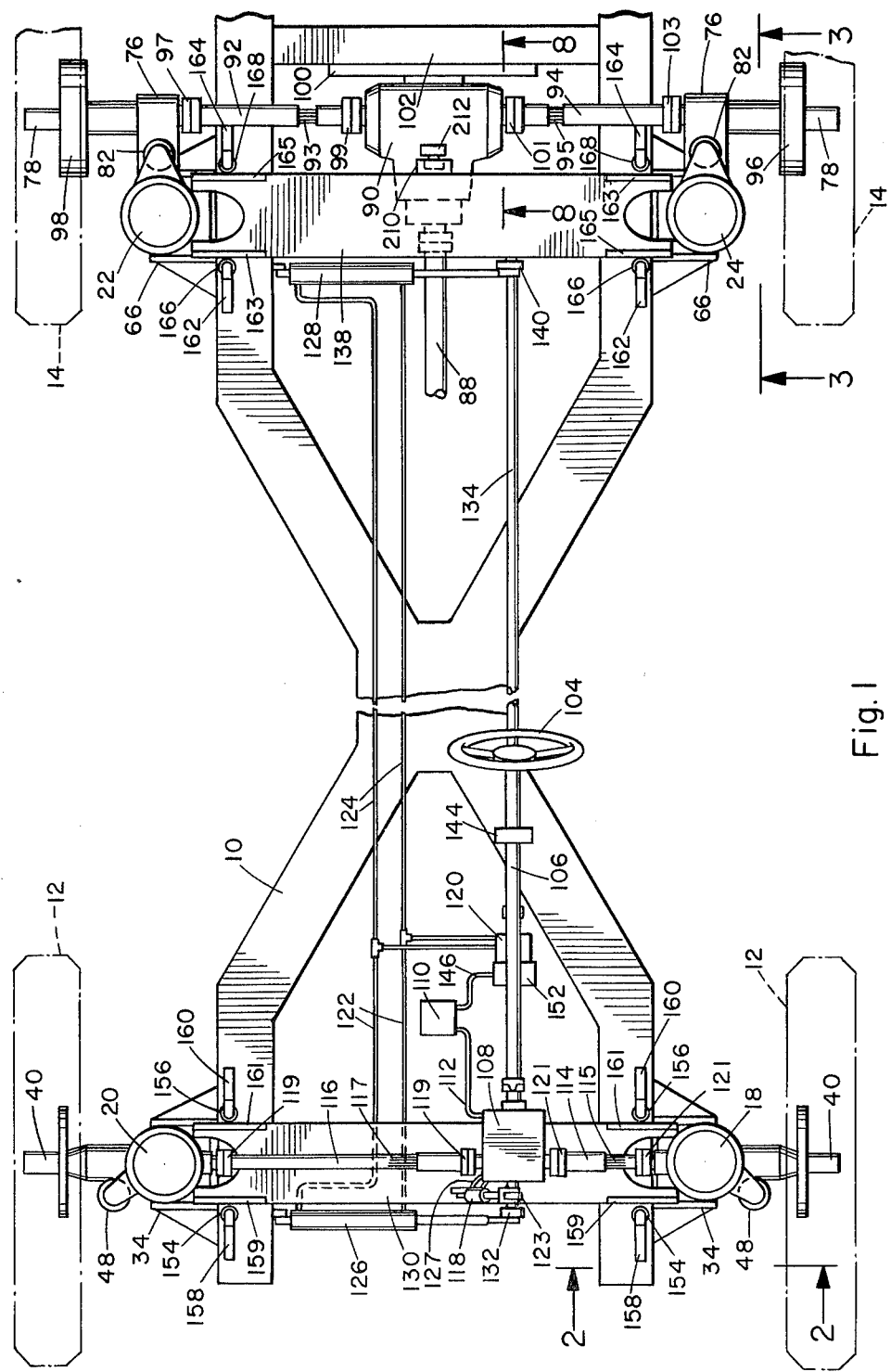
FIG. 1 is a top plan view of the chassis of a vehicle incorporating a tilting suspension system in accordance with the invention.

Turning now to the drawings and as best seen in FIG. 1 the vehicle suspension system in accordance with the invention includes a main chassis or frame 10 in the illustrated embodiment having a generally double Y or "wishbone" configuration of a frame with a pair of front ground engaging wheels 12 and a pair of rear ground engaging wheels 14. The configuration of the frame is not critical and is for illustration only. The chassis is designed or illustrated for an automotive type vehicle of the type having rear driven wheels, although it could be used for front driven or all four-wheel driven vehicles or substantially any other configuration. The system is designed to suspend or support each wheel independently and in a manner to substantially maintain the vehicle chassis in a substantially level configuration when cornering and traversing rough terrain.

As best illustrated in FIG. 1, the system includes pods or suspension unit 18, 20, 22 and 24 for each wheel of the vehicle. Detail construction of a front pod is illustrated with references to FIG. 2.

Figure 2:
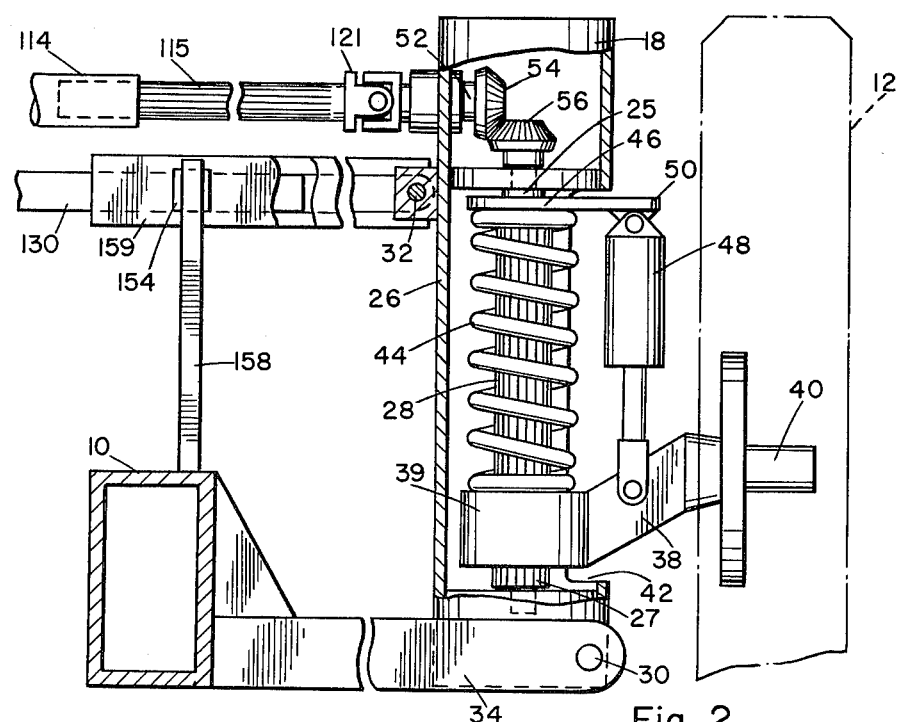
FIG. 2 is a detailed view with portions cut away of a front suspension unit of the chassis taken on line 2—2 of FIG. 1.

As best seen in FIG. 2, the pod 18 includes a generally cylindrical housing 26 having a generally cylindrical chamber in which is mounted a splined shaft 28 for rotation in suitable upper and lower bearings 25 and 27 at the upper and lower ends of the housing 26. The shaft 28 acts generally as a king pin for the front or steering suspension unit of the vehicle 10. The pod housing 26 is mounted on a pair of aligned pivot pins or shafts 30, similar to that disclosed in FIG. 3 relative to pins 62 and 64, (only one of which is shown) within separate spaced apart arms or yokes 34 of a fork assembly extending outward from the side of the front end of the chassis or frame 10. The pod or housing 26 is adapted to tilt about a pivot axis that is provided by shaft 30.

An axle support arm 38 (FIG. 2) is vertically, slidably splined to the rotatable shaft 28 and includes a spline housing 39 and an axle shaft 40 on which the front wheel 12 is rotatably mounted. The shaft or arm 40 extends outward from the housing 26 through an opening 42 in the wall of the cylindrical housing 26 for rotatably mounting a front wheel for rotating about the axis of shaft 40 which is offset above the pivot axis at pin 30. A spring of a coil-type 44 bears at the upper end against a thrust plate 46 secured to the shaft 28 within the housing 26 and at the lower end against the upper surface of the spline housing 39 of arm portion 38, for maintaining the axle or arm 38 at the lower end of shaft 28 to provide the resilient spring or support of the chassis.

A shock absorber 48 (FIG. 2) is pivotally connected at the upper end to an arm or the like 50 on thrust plate 46 and at the lower end to the axle arm 38 by a suitable shock absorber connection, such as a resilient pin connection (not shown). Thus, the usual spring and damping functions are incorporated within the suspension unit.

A steering shaft 52 (FIG. 2) rotated by direct gearing by the steering wheel 104 (see FIGS. 1 and 7) of the vehicle is mounted in the housing 26 and includes a bevel gear 54 drivingly engaging a like or corresponding bevel gear 56 on the upper end of shaft 28. This rotates the shaft 28 for effecting steering of the front wheels of the vehicle through the spline connection of the spline portion of shaft 28 to spline housing 39 and to the wheel axle 40. Other means of steering may be utilized, however, the shaft assembly as illustrated has certain advantages as will be explained which permits the steering mechanisms and assemblies to follow the tilt of the front wheels.

Figure 3:
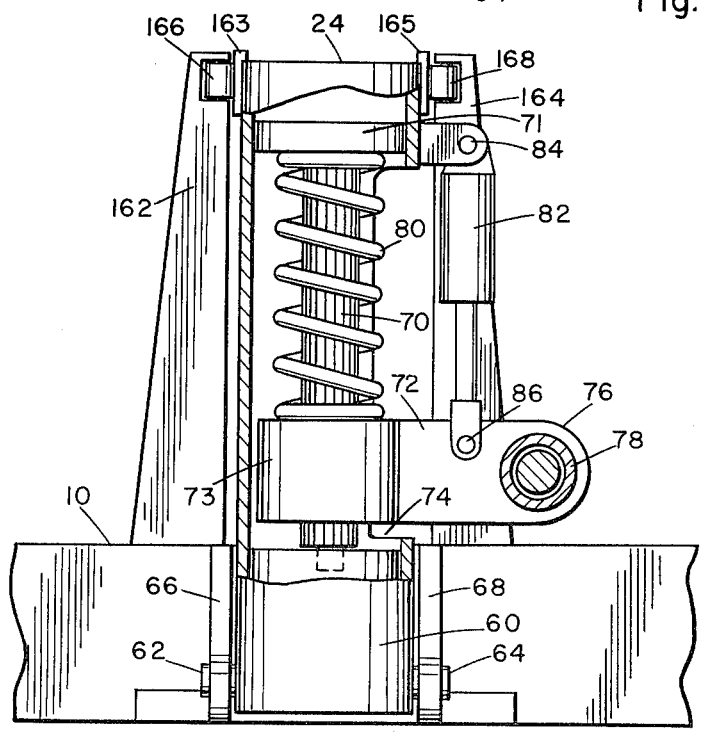
FIG. 3 is a detailed view taken on line 3—3 of FIG. 1 with portions cut away of a rear suspension unit.

The rear wheel tilt and support assembly, as best seen in FIG. 3, includes a generally cylindrical housing 60 pivotally mounted by a pair of pivot pins 62 and 64 between a pair of brackets 66 and 68 secured to and extending outward from the frame 10. These pivot pins are disposed at the lower end of the housing 60 and are aligned to the side of the frame or vehicle parallel to the axis thereof. The housing 60 defines a substantially cylindrical chamber and includes a concentrically mounted or coaxially mounted splined shaft 70 that is fixed within the housing for nonrotation therewith. An axle support arm 72 is splined to the splined portion of shaft 70 and slidably mounted thereon and extends outward through an opening 74 in the back side of the housing 60 and includes a bearing mount 76 for mounting a stub axle 78. A spring of a coil-type 80 is mounted within the housing 60 bearing against a plate 71 secured within the housing 60, and engages the upper surface of the splined housing 73 of the arm 72 for maintaining the axle support arm 72 to the lower most position within the housing 60 to provide the resilient spring or support of the chassis. The shaft 70 is in a fixed not rotatable position in housing 60. A shock absorber 82 is pivotally connected at 84 at the upper end to the housing 60 and at 86 on the lower end to the axle support arm 72 by a suitable shock absorber connector (not shown). Thus, the usual spring and damping functions are incorporated within the suspension unit.

The power train of the vehicle connected to the rear drive axles include a drive shaft 88 (FIG. 1), having the usual splined telescoping configuration and universal joints as required, driven in the usual manner from the engine and transmission (not shown) and drivingly connected to a differential 90. The differential is connected by means of half-axles 92 and 94 with splined slidable joints 93 and 95 intermediate the ends thereof and the necessary universal joints 97, 99, 101 and 103 at the ends thereof to stub axles 78 and their respective wheel hubs 96 and 98. This is necessary because of the offset of the axle axis above the pivot axis of the rear wheels.

Figure 5:
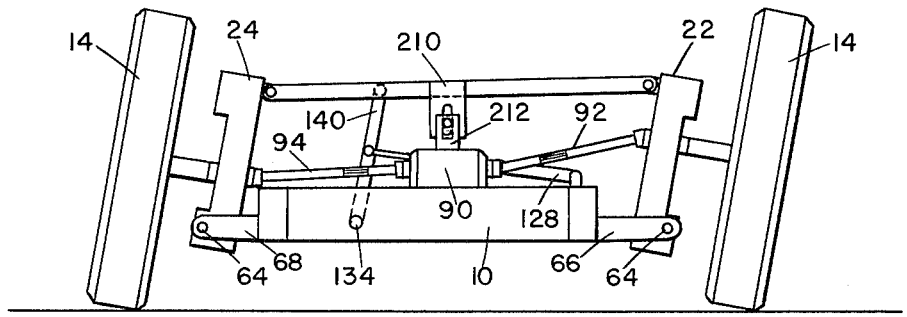
FIG. 5 a rear elevation view of the chassis of FIG. 1.
Figure 8:
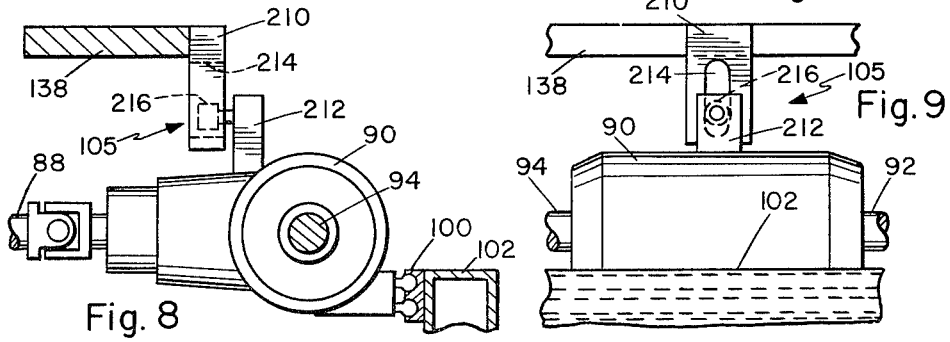
FIG. 8 is an enlarged sectional view taken on line 8—8 of FIG. 1.
Figure 9:
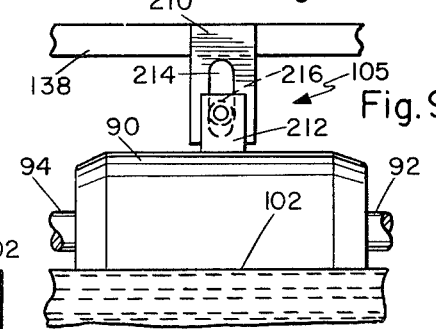
FIG. 9 is a rear view as taken from the right hand side of FIG. 8.

The splined slidable joints 93 and 95 provide slight longitudinal movement of half-axles 92 and 94 required due to centerline variations of differential 90 and stub axles 78 connecting to their respective wheel hubs 96 and 98, due to vertical travel of arm 72 (FIG. 3) within the rear suspension units 22 and 24 (FIGS. 1, 3 and 5). The differential 90 (FIGS. 1 and 5) is slidably mounted on a track 100 on a cross member 102 for permitting the differential 90 to slide or shift laterally with respect to the axis of the frame or chassis 10 of the vehicle with lateral movement of the drive axles upon tilting of the wheels of the vehicle. A link 105, of the scotch yoke type, connects the differential 90 to the tie link 138 to shift therewith upon tilt of the wheels, see FIGS. 8 and 9. This link includes roller or follower pin 216 mounted on a bracket 212 on differential 90. A bracket 210 mounted on the tie link 138 includes a channel or slot 214 engaged by follower 216. This arrangement uses the force of link 138 to move the differential to accommodate the lateral movement of the drive axles 92 and 94 which are offset above the pivot axis of pivot pins 62 and 64, see FIG. 5. This removes the load of the differential from the drive shafts and transfers it to link 138.

The tilting of the wheels of the vehicle is controlled by the driver in coordination with the turning of the vehicle, by tilting the wheels into the turn as the vehicle is turned. This may be accomplished either mechanically or by power assist means such as hydraulic, air or electric motors. In the illustrated embodiment (FIG. 1), a mechanical linkage and power assist hydraulic system is illustrated and is integrated into and linked to the usual power assist steering system. In this manner, proportional steering of the vehicle can be augmented by a proportional tilting of the wheels as desired. In the illustrated embodiment, for example, a steering wheel 104 (FIG. 1) is connected in the usual manner by a steering shaft 106 to a steering control mechanism and servo unit 108 mounted rigidly to tie link 130, such as a power steering unit having pressurized hydraulic fluid supplied thereto by a pump 110 (driven by the vehicle engine, not shown) through hydraulic lines 112.

Figure 4:
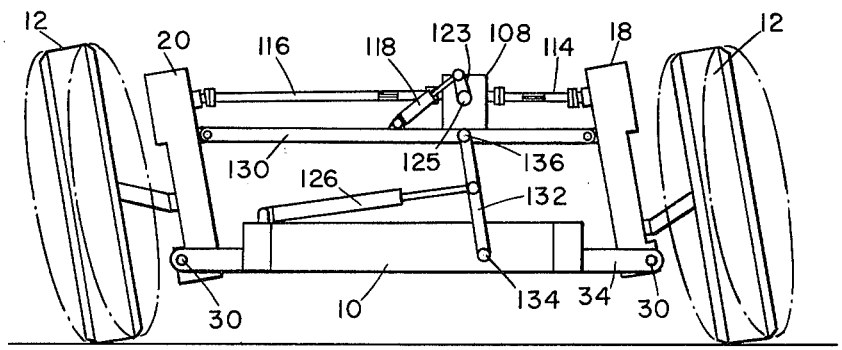
FIG. 4 is a front elevation view of the chassis of FIG. 1.
Figure 6:
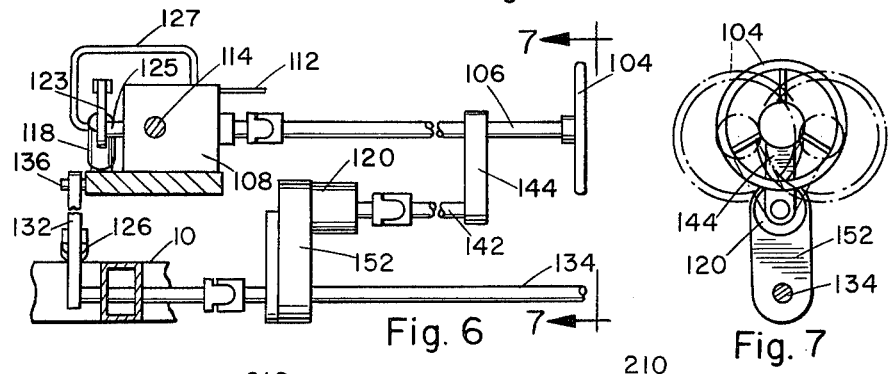
FIG. 6 is a side elevation view of a portion of the steering and tilt control of the chassis of FIG. 1.

The steering linkage itself preferably includes a type drive for translating rotation of the steering shaft 106 (FIG. 1) into rotation of steering shafts 114 and 116, on a 1 to 1 ratio. Each of the steering shafts 114 and 116 have a splined slidable joint 115 and 117 providing longitudinal movement during tilting of the wheels 12, (FIGS. 1 and 4). The need for these slidable joints is due to centerline of pivot pin 32 (FIG. 2), and centerline of the universal joint 119 and centerline of universal joint 121 being offset or nonaligned. The universal joints 119 and 121 at each end of shafts 114 and 116 (FIG. 1), provide necessary rotational movement during tilting of the wheels, due to the centerline variations of shaft and steering control mechanism and servo unit 108 (FIGS. 1, 4 and 6). Thus, shafts 114 and 116 are operationally connected to the bevel gear assembly 54 and 56 (FIG. 2), and the respective steering assemblies (FIG. 2), of the respective wheels 12.

A source of hydraulic fluid may be fed by suitable means such as by means of hydraulic line 112, (FIGS. 1 and 6) to the steering control mechanism and servo unit 108, and by hydraulic lines 127 to steering assist cylinder 118, or linear actuated motor, connected to a stationary portion of the tie link 130, with the piston rod or the like pivotally connected to an arm 123 secured to the stub shaft 125, FIG. 6, gearingly connected to the steering control mechanism and servo unit 108 for steering the respective wheels 12 of the vehicle.

This same source of hydraulic fluid may be fed by suitable means such as by means of hydraulic lines 146 (FIG. 1) to tilting servo unit 120 and by hydraulic lines 122 and 124 to tilt assist cylinders, or linear actuating motors 126 and 128 for simultaneous tilting the front wheels 12 and rear wheels 14 respectively of the vehicle. These tilting cylinders or linear activated motors, 126 and 128, are each connected to a stationary portion of the frame 10 with the piston rod or the like connected to a tilt link arm 132 and 140 (FIGS. 1, 4, 5 and 6) connecting the tie links 130 and 138 to the respective suspension units, or pods, for tilting the respective suspension units 18, 20 and 22, 24 about their pivot axis, which is parallel to the longitudinal axis of the chassis or frame 10 of the vehicle.

Turning to FIG. 4, a front view of the chassis is illustrated showing the front wheels 12 tilted to the right from the drivers position as in a right turn of the vehicle. The tilt linkage includes a tie link 130 pivotally connected by pivot pins 32 to the upper end of each of the front suspension units or pods, 18 and 20 tying them together for tilting together simultaneously. The tilt of the pod 18 relative to steering shaft 114 is permitted by spline 115. Similarly, the tilting of pod 20 is permitted by spline 117 in shaft 116. The tilt cylinder or linear actuating motor 126 is connected to a link or arm 132 which is mounted at its lower end on the end of a rotatable tilt control shaft 134 and pivotally connected at its upper end by a pin 136 to the tie link 130.

A similar linkage as shown in FIG. 5 connects the rear suspension units 22 and 24, pods, for tilting of the rear wheels 14. The tilt linkage includes a tie link 138 pivotally connected at each end by pivot pins (not shown) to the upper ends of the rear suspension units or pods 22 and 24 tying them together for tilting together simultaneously. The tilt cylinder, linear activating motor, 128 is connected to a link or arm 140 which is mounted at its lower end on the end of a rotatable tilt control shaft 134 and pivotally connected by a pin 136 at its upper end to the tie link 138. Thus, the front wheels 12 and rear wheels 14 are tied together through the linkage to tilt together simultaneously.

Figure 7:
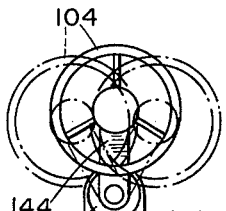
FIG. 7 is a rear to front view as taken from the right hand side of FIG. 6.

Turning to FIGS. 6 and 7, the tilt control system is illustrated in more particular detail. This system includes a tilt control servo valve 120 which is actuated by a rotary shaft 142 which is rotated about its axis by an operator control lever 144 which supports the steering wheel 104. The tilt control servo valve 120 directs fluid from pump 110 (FIG. 1) by way of hydraulic lines 122 and 124 to the front and rear tilt cylinders or linear actuated motors 126 and 128. The tilt control servo valve 120 is connected by a drive transmission 152 to the tilt control shaft 134 for servo feedback or wheel tilt to the valve. The details of the servo valve 120 are not shown as such valves are well known in construction, such as used in steering systems.

With the illustrated arrangement, (FIGS. 6 and 7) the operator may control tilt of the wheels by tilting operator control lever 144 about the axis of shaft 142 independently of steering, but preferably coordinates the tilt with steering of the wheels according to the speed and the radius of the turn the operator is negotiating. The vehicle can be steered and the wheels tilted independently or simultaneously as desired. Tilting of lever 144 rotates shaft 142 which drives directly through gearing 152 to drive the tilt control shaft 134 for tilting arms 132 and 140 (FIGS. 4 and 5), to drive tie links 130 and 138 to tilt the ground engaging wheels 12 and 14. The tilt control lever 144 is tilted in the direction of the turn thereby leaning the wheels of the vehicle into the turn much like when steering a motorcycle.

The mechanical drive through linkage from lever 144 (FIG. 6) to arms 132 and 140 in FIGS. 4 and 5, is power assisted by pump 110 and lines 122 and 124 connected to the tilt control servo valve 120, and tilt cylinders 126 and 128 (FIGS. 4 and 5).

Additional support of the suspension units, 18, 20, 22 and 24 is provided by thrust brackets 158, 160, 162 and 164 rigidly mounted to frame 10 as shown in FIG. 1, and including antifriction rollers 154, 156, 166 and 168 (FIGS. 2 and 3), rotatably mounted on the thrust brackets 158, 160, 162 and 164 (FIGS. 1, 2, and 3), and bearing against and providing rolling engagement with thrust plates 159, 161, 163 and 165 (FIGS. 2, 3, and 6) rigidly fixed to the forward and rear edges of tie link 130 and 138 (FIGS. 1, 2, 3, and 6). These brackets 158, 160, 162 and 164 with their respective antifriction rollers 154, 156, 166 and 168 thus have rolling engagement with the thrust plates 159, 161, 163 and 165 fixed to tie links 130 and 138, thus providing support to the upper end of the suspension units 18, 20, 22 and 24 pivotally connected to the tie links 130 and 138, thus limiting forward and backward movement.

In operation, as a vehicle incorporating the chassis and suspension system of the present invention, enters a turn the driver rotates the steering wheel 104 in the direction of the turn and simultaneously therewith tilts the tilt control lever 144 by shifting the steering wheel in the direction of the turn. The steering drive is preferably a direct 1 to 1 drive through the steering shaft and steering gear box 108 and from there with power assist through splined direct drive steering shafts 116 and 114, each of which is splined at 115 and 117 respectively to accommodate the variation in the pivot points in the front linkage and suspension system. The shafts also include universal joints at each end thereof to permit the suspension pods 18 and 20 to tilt with respect to the steering shafts 114 and 116. As the wheel tilt, preferably in coordination with, and in proportion to, the turn up to as much as 45°, the frame of the vehicle will shift relative to the position of the wheels because of the fact as seen in FIG. 2 the rotatable axis of the wheels are positioned a distance upwardly from the pivot pins 30 of the particular suspension unit. For this reason, the various linkages, universal joints and the like must be provided in the system at the front of the vehicle. A similar construction is required at the rear of the vehicle as will be explained. As the tilt control lever 144 is tilted in the direction of the turn, the lever operates servo control valve 120 and is directly gear connected to the tilt control shaft 134 which in turn is connected by arms 132 and 140 to the respective tie links 130 and 138 which tie the suspension pods together at the front and rear of the vehicle. The servo control valve 120 functions to control the communication of pressurized hydraulic fluid to the tilt control hydraulic motors 126 and 128 at the front and back respectively of the vehicle which act to apply the force or at least power assist the tilting of the wheels of the vehicle into the turn. The tilt control shaft 134 being directly connected by gears to the servo control valve 120 provides a direct servo feedback to the control valve 120.

The tilt operation of the rear wheels which tilt in unison with the front wheels will best be understood from viewing FIG. 5. Upon activating the tilt control system the hydraulic motor 128 is activated, thus applying a force to the arm 140 tied to the tie link 138 which in turn is pivotally connected to the respective suspension pods 22 and 24 and thus applying a tilting force to the upper ends of the respective pods. The pods being pivotally mounted at pins 64 to pivot in the required direction. The offset misalignment of the drive shaft with respect to the tilt axis 64 requires that the drive shafts include telescoping splined connections to accommodate the relative movement therein. In addition, the differential is slidably mounted on the cross member 102 of the frame and is connected to the tie link 138 by a scotch yoke arrangement such that the link member 138 pulls the differential in the direction of tilt to accommodate the movement in the position of the wheels and to relieve the axles of the stress of movement of the differential. The linkage and suspension system is thus designed and provided with the necessary linkages, sliding in universal joints to accommodate the tilting of the wheels of the vehicle and, at the same time, accommodate the bouncing of the wheels relative to the chassis or frame whether the wheels are in an upright position or in a tilted position.

From the above construction, it is seen that I have provided an improved suspension system having tilting means for tilting the wheels of a vehicle into a turn when the vehicle is negotiating a turn.

While I have illustrated and described my invention by means of specific embodiments, it is to be understood that numerous changes and modifications may be made therein without departing from the spirit and scope of the invention as defined in the appended claims.

I claim:

1. A vehicle chassis including a tiltable wheel suspension system having a suspension unit for each wheel of said chassis, said system comprising:
   a frame,
   a pair of spaced apart front suspension units pivotally mounted to said frame for rotatably mounting a pair of front wheels on said frame for tilting about a horizontal axis below the rotary axis of said wheels and parallel to the plane of said wheels,
   a pair of rear suspension units pivotally mounted to said frame for rotatably mounting a pair of rear wheels for tilting about a horizontal axis below the rotary axis of said wheels and parallel to the plane of said wheel, wherein said suspension units maintains said chassis substantially level during tilting of said wheels,
   steering means mounted on said frame for steering one of said pair of front and rear wheels, and
   tilting control means for coordinated tilting of said wheels in the direction of turning of the wheels of said vehicle.

2. The vehicle chassis of claim 1 wherein said suspension means maintains said chassis substantially level during tilting of said wheels.

3. The vehicle chassis of claim 1 wherein said wheels are tiltable in either direction up to 45° with respect to the vertical plane.

4. The vehicle chassis of claim 1 wherein said tilting control means comprises a pivotally mounted control lever for pivoting in the direction of desired tilt of said wheels, and
   linkage means operatively connecting said control lever to the suspension units for the wheels of said vehicle.

5. The vehicle chassis of claim 4 including a front tie link connecting each of said front suspension units for pivoting in unison, and a rear tie link connecting each of said rear suspension units for pivoting in unison.

6. The vehicle chassis of claim 5 wherein said steering means is operatively connected for steering the front wheels of said chassis, said steering means including a steering wheel mounted on said control lever.

7. The vehicle chassis of claim 6 wherein said tilt control means includes an elongated rotatable shaft extending the length of the chassis, arm mounted on each end of said shaft, each arm connected to one of said front tie link and said rear tie link, and
   hydraulic power assist means connected to said linkage means for providing a power assist to tilting of the wheels of said chassis.

8. The vehicle chassis of claim 7 including stabilizing means for said suspension units, said stabilizing means comprising a plurality of thrust brackets fixed to said frame and engaging said front tie link and said rear tie link for stabilizing said suspension units.

9. The vehicle chassis of claim 1 wherein said suspension units are each pivotally mounted to said frame for pivoting about an axis disposed below the rotatably axis of said respective wheels.

10. The vehicle chassis of claim 9 wherein said suspension units each includes a generally vertically oriented housing pivotally mounted to a fixed pivot bracket on said frame and including resilient suspension means within said housing for resiliently supporting the axle for the respective wheels on said frame.

11. The vehicle chassis of claim 10 wherein said rear wheels of said chassis are driving wheels of said chassis and interconnected by means of a differential, and
    means for supporting said differential for movement transverse to the longitudinal axis of said frame during tilting of the rear wheels of said vehicle.

12. The vehicle chassis of claim 11 wherein:
    said drive axle includes telescoping drive shafts between said differential and each of said wheels,
    each of said drive shaft including a universal joint adjacent each end thereof.

13. A vehicle chassis including a tiltable wheel suspension system having a suspension unit for each wheel of said chassis, and system comprising;
    a frame,
    a pair of spaced apart front suspension units for rotatably mounting a pair of front wheels on said frame for tilting about a horizontal axis in the plane of said wheels,
    a pair of rear suspension units for rotatably mounting a pair of rear wheels for tilting about a horizontal axis in a plan of said wheel,
    said suspension units each includes a generally vertically oriented housing pivotally mounted to a fixed pivot bracket on said frame for pivoting about an axis disposed below the rotatable axis of said respective wheels and including resilient suspension means within said housing for resiliently supporting the axle for the respective wheels on said frame,
    steering means mounted on said frame for steering one of said pair of front and rear wheels,
    tilting control means for coordinated tilting of said wheels in either direction up to 45° with respect to the vertical plane, wherein said rear wheels of said chassis are driving wheels of said chassis and interconnected by means of a differential, means for supporting said differential for movement transverse to the longitudinal axis of said frame during tilting of the rear wheels of said vehicle, said drive axle includes telescoping drive shafts between said differential and each of said wheels, each of said drive shaft including a universal joint adjacent each end thereof; and a scotch yoke mechanism operatively connecting said rear tie link to said differential for movement of said differential transverse to the axis of said chassis with tilting of said wheels.

14. The vehicle chassis of claim 10 wherein said steering means includes a direct gearing drive mechanism rigidly mounted on the front tie link and including an elongated rotatable shaft connecting said steering wheel thereto, a pair of elongated rotatable shafts with slidable splined joints and universal joints at each end thereof extending along said front tie link to each of said front suspension units, and a direct gearing mechanism mounted within each of said suspension units connecting said elongated rotatable shaft to said suspension units for steering said front wheels.

15. The vehicle chassis of claim 14 wherein:

said steering means includes a hydraulic power assist means connected to said steering means for providing power assits to turning of said front wheels.

16. A vehicle chassis including a tiltable wheel suspension system having a suspension unit for each wheel of said chassis, said system comprising:

a frame, a pair of spaced apart front suspension units for rotatably mounting a pair of front wheels on said frame for tilting about a horizontal axis in the plane of said wheel, a pair of rear mounting units for rotatably mounting a pair of rear wheels for tilting about a horizontal axis in a plane of said wheel, steering means mounted on said frame for steering one of said pair of front and rear wheels, tilting control means for coordinated tilting of said wheels in either direction up to 45° with respect to the vertical plan in the direction of turning of the wheels of said vehicle, said rear wheels are driven through and connected by half-axles to a differential, and said differential is slidably mounted to said chassis having slidably splined joints in each of the half-axles, and a link of the scotch yoke type operatively connecting said differential and said rear tie link for the purpose of retaining near equal center distances between said differential and said suspension units during straight-up and tilting positions of said wheels.

17. The vehicle chassis of claim 3 wherein:

each of said suspension units comprises a mounting pod having a generally cylindrical configuration for mounting in a vertical orientation on said vehicle chassis, pivot mounting means at the lower end of said pod for pivotally mounting on the vehicle chassis, a vertically oriented splined shaft mounted in said pod, a support arm slidably mounted on said splined shaft and extending outside said pod and including axle means for rotatably mounting a ground engaging wheel.

18. The vehicle chassis of claim 17 wherein said splined shaft for said front suspension units is rotatably mounted in said pod.

19. The vehicle chassis of claim 17 wherein said axle means for rotatably mounting said wheel is positioned above said pivot mounting means.

20. The vehicle chassis of claim 19 including a coil spring disposed within said pod for biasing said support arm to the lower most position on said splined shaft for resiliently supporting said frame of said chassis relatively to said wheels.

* * * * *

UNITED STATES PATENT AND TRADEMARK OFFICE
CERTIFICATE OF CORRECTION

PATENT NO. : 4,487,429
DATED : December 11, 1984
INVENTOR(S) : Thomas P. Ruggles It is certified that error appears in the above-identified patent and that said Letters Patent are hereby corrected as shown below:

Column 8, line 27, change "rotatably" to --rotatable--.

Column 9, line 31, change "assits" to -- assist --.

Signed and Sealed this

Seventh Day of May 1985

[SEAL]

Attest:

DONALD J. QUIGG

Attesting Officer    Acting Commissioner of Patents and Trademarks